US007486758B1

(12) United States Patent
Turchi

(10) Patent No.: US 7,486,758 B1
(45) Date of Patent: Feb. 3, 2009

(54) COMBINED PLASMA SOURCE AND LINER IMPLOSION SYSTEM

(75) Inventor: Peter J. Turchi, Santa Fe, NM (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 11/554,088

(22) Filed: Oct. 30, 2006

(51) Int. Cl.
*H05H 1/22* (2006.01)
*G21B 1/00* (2006.01)

(52) U.S. Cl. .................. 376/128; 376/107; 376/130; 376/149; 315/111.41; 315/111.21; 315/111.31

(58) Field of Classification Search .............. 376/107, 376/128, 143, 145, 144, 130, 140; 315/111.41, 315/111.21, 111.31, 111.61, 111.71, 111.81, 315/111.91; 176/2, 3, 4, 5, 6, 7, 8
See application file for complete search history.

(56) References Cited

U.S. PATENT DOCUMENTS

| 4,347,621 A * | 8/1982 | Dow ........................ 376/139 |
| 6,488,052 B2 * | 12/2002 | Hupertz et al. ............. 138/135 |
| 6,611,106 B2 * | 8/2003 | Monkhorst et al. ...... 315/111.41 |
| 7,115,887 B1 * | 10/2006 | Hassanein et al. ........ 250/504 R |
| 2005/0129161 A1 * | 6/2005 | Laberge ..................... 376/144 |
| 2006/0198483 A1 * | 9/2006 | Laberge ..................... 376/100 |

OTHER PUBLICATIONS

Lindemuth et al, "Target plasma formation for magnetic compression/magnetized target fusion", Physical Review Letters, V. 75(10), 1953-1956, 1995.*

Lindemuth, "Magnetized plasma fusion-an ultrahigh energy approach in an unexplored parameter space", LA-UR, Conf—9411182—2, 1994.*

Turchi et al., Generation of high- energy x-radiation using a plasma flow switch, J. Appl. Physics, 69(4), p. 1999, 1990.*

Ozur et al., A Wide-Aperture, Low-Energy, and High-Current Electron Beam Source with a Plasma Anode Based on a Reflective Discharge, Instruments and Experimental Techniques, vol. 48, No. 6, 2005, pp. 753-760.*

(Continued)

*Primary Examiner*—Jack W Keith
*Assistant Examiner*—Vadim Dudnikov
(74) *Attorney, Agent, or Firm*—Kenneth E. Callahan

(57) ABSTRACT

A novel arrangement that combines in a single compact embodiment a plasma flow switch source of ultrahigh speed plasma and an electromagnetically-imploded cylindrical shell. The shell, known as a liner, forms the wall of a cavity that receives and stagnates the plasma flow. The plasma and the liner are connected electrically in series so that a single multi-megampere current serves both elements and operates from the same power source and switch. The operation is timed so that the plasma is injected into the cavity once the liner has attained sufficient implosion speed. The liner then continues to implode, reducing the cavity volume and compressing the plasma further to very high temperatures and densities, thereby creating a compact, intense pulsed neutron source generated by thermonuclear reactions in the compressed plasma. Such a neutron source has application for neutralizing bio/chemical warfare agents, radiography, and material processing.

3 Claims, 7 Drawing Sheets

OTHER PUBLICATIONS

Lindemuth, "Magnetized plasma fusion-an ultrahigh energy approach in an unexplored parameter space", LA-UR, Conf—9411182—2, 1994 (henceforth called "Lindemuth2") p. 5, Fig. 8, p. 9, Fig. 13.*

Lindemuth, "Magnetized plasma fusion-an ultrahigh energy approach in an unexplored parameter space", LA-UR, Conf-9411182—2, 1994 (henceforth called "Lindemuth2") p. 5, Fig. 8, p. 9, Fig. 13.*

P.J. Turchi, et al, Generation of High Energy X-Radiation Using a Plasma Flow Switch, J. Appl.Phys. vol. 69 (4), p. 1999, (Feb. 1991).*

V.K. Chernyshev, "Superpower Explosive Magnetic Energy Sources (XXth Century Results. Tasks in the Beginning of XXI st Century)" Int. Conf. Megagauss 10, Santa Fe, 2004.*

P.J. Turchi, et al, "Generation of High Energy X-Radiation Using a Plasma Flow Switch,"J. Appl. Phys. vol. 69 (4), p. 1999, (Feb. 1991).

J.H. Degnan, et al, "Electromagnetic Implosion of Spherical Liner", Phys. Rev. Lett. 74, 1, 98 (Jan. 1995).

I.R. Lindemuth et al, Phys. Rev. Lett. 75, 1953 (1995).

* cited by examiner

FIG. 2
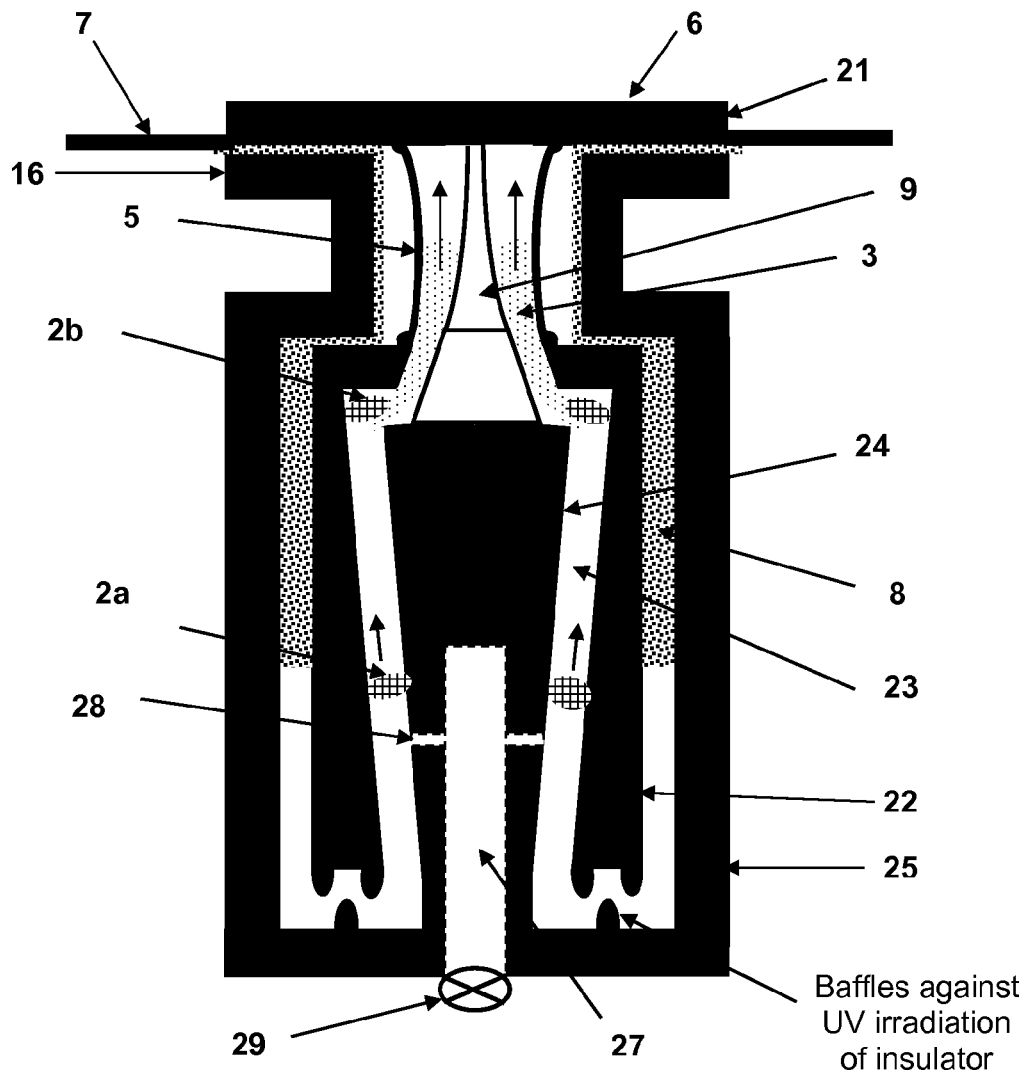
Baffles against
UV irradiation
of insulator
 Low-density, magnetized plasma 3
 Plasma armature 2
 Cylindrical liner 5
 Insulation 8
 Coaxial electrodes and transmission plates to multi-megampere source Time in units of $(L_oC)^{1/2}$

FIG. 6

Sample values for a Combined Plasma Source and Liner Implosion System
(corresponding to Figure 4)

<u>Power source</u>     Shiva Star

| | |
|---|---|
| Capacitance | 1330 μF |
| Total inductance | 60 nH |
| Charging voltage | 90 kV |
| Peak current | 7.4 MA |
| Current rise-time | 7.6 μs |

<u>Liner</u>

| | |
|---|---|
| Initial radius | 29 mm |
| Initial length | 100 mm |
| Initial thickness | 2.1 mm |
| Material | Lithium |
| Speed at r = 21 mm | 3.7 km/s |

<u>PFS</u>

| | |
|---|---|
| Center conductor radius | 45 mm |
| Outer/Inner radius ratio | 1.33 |
| Plasma armature motion | 180 mm |
| Plasma armature mass | 73 mg |
| Plasma armature speed | 82 km/s |

COMBINED PLASMA SOURCE AND LINER IMPLOSION SYSTEM

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BRIEF DESCRIPTION OF THE DRAWINGS

FIG. 2 is a more detailed embodiment of the invention.

FIG. 6 is a table of values used for performance calculations.

DESCRIPTION OF THE PREFERRED EMBODIMENT

Figure 1:
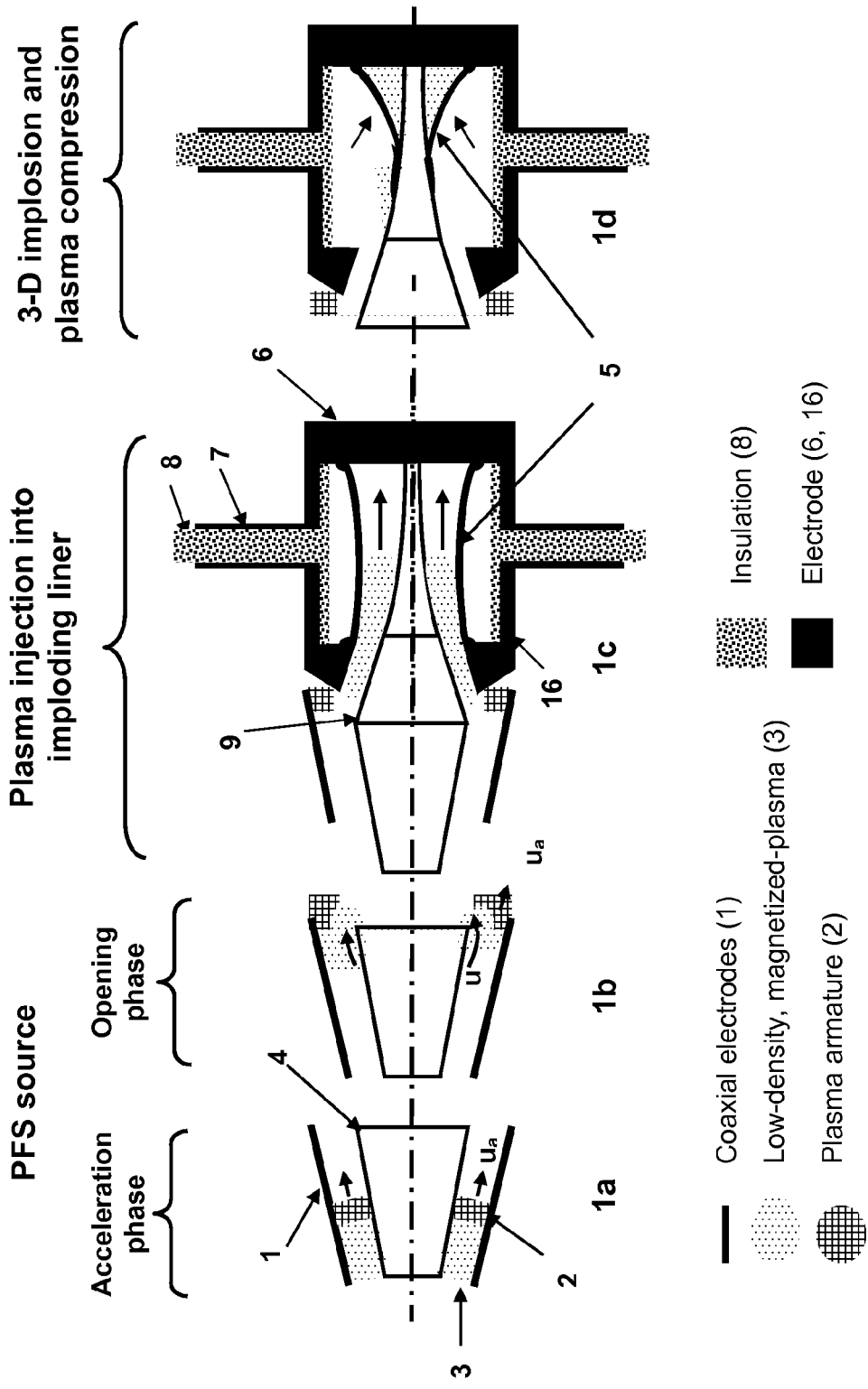
FIG. 1 is a conceptual schematic showing the use of the plasma flow switch to sequentially inject ultrahigh speed plasma into the volume surrounded by an imploding liner, wherein the liner implosion then further compresses the trapped plasma to higher densities and temperatures. The four phases detailed are: 1a—acceleration of the plasma armature; 1b—opening phase; 1c—low density, magnetized plasma injected into the imploding liner; and 1d—final phase of plasma compression creating the conditions for thermonuclear reactions that produce an intense pulsed neutron source.

The present invention combines the operations of a plasma flow switch (PFS) plasma source, an electromagnetically-imploded liner, and a plasma compression system to create an intense pulsed neutron source based on thermonuclear reactions in the compressed plasma. A plasma flow switch is the source of ultrahigh speed plasma that is injected into an electromagnetically-imploded cylindrical shell, known as a liner. The liner forms the surrounding wall of a cavity which receives and stagnates the plasma flow. The liner continues to implode following plasma injection, reducing the cavity volume, and thereby compressing the plasma to very high temperatures and densities. These conditions initiate thermonuclear reactions in the compressed plasma resulting in the release of neutrons. Such a neutron source has applications for neutralizing bio/chemical warfare agents, radiography, and material processing.

The PFS plasma source is comprised of a coaxial pair of electrodes connected by a thin foil of material, such as deuterated polyethylene or lithium. The regions on both sides of the foil are initially evacuated. A gas-puff of a deuterium-tritium mixture is injected between the foil and a multi-megampere source of current just prior to closure of a switch connecting the PFS to the current source. The high voltage appearing across the foil after switch closure results in an electrical discharge through the foil material and electromagnetic acceleration of this material, known as the plasma armature, along the length of the electrodes to speeds in excess of 70 km/s. The electrical discharge causes ionization of the deuterium-tritium gas-puff in the presence of the azimuthal magnetic field of the discharge through the foil and results in relatively low mass-density, magnetized plasma following the foil material. When the plasma armature passes over the end of the center conductor, the magnetized, low-density plasma is released as a plasma flow with a speed upwards of 2000 km/s. Background information on plasma flow switches can be found in P. J. Turchi, et al, "Generation of High Energy X-Radiation Using a Plasma Flow Switch," J. Appl. Phys. Vol. 69 (4), P. 1999-2007, February 1991.

The current through the plasma armature is also directed to flow through the cylindrical liner. Interaction of this current with the associated azimuthal magnetic field results in an electromagnetic force imploding the liner. The motions of the liner and the PFS plasma armature are arranged so the liner has achieved a speed of about 4 km/s by the time the ultrahigh speed plasma from the PFS is injected into the interior volume surrounded by the liner. The shape of the liner provides a nozzle throat at the upstream end of this volume so the plasma flow is supersonic with speed much larger than the local Alfven sound speed. A shock reflects into this flow from the closed end of the volume, stagnating the plasma at high temperatures (~600 eV). Subsequent motion of the liner closes off the nozzle, trapping the plasma and compressing it both radially and axially, to higher densities and temperatures (~10 keV). As the density and temperature of the plasma increase, the rate of thermonuclear reaction increases rapidly and provides an intense burst of neutrons. Background information on liner implosion can be found in J. H. Degnan, et al, "Electromagnetic Implosion of Spherical Liner," Phys. Rev. Lett. 74 (1), pp. 98-101 (Jan. 1995) and on plasma compression by liner implosion at I. R. Lindemuth, et al, "Target Plasma Formation for Magnetic Compression/Magnetized Target Fusion," Phys. Rev. Lett. 75 (10), pp. 1953-1956, (September 1995).

Figure 3:
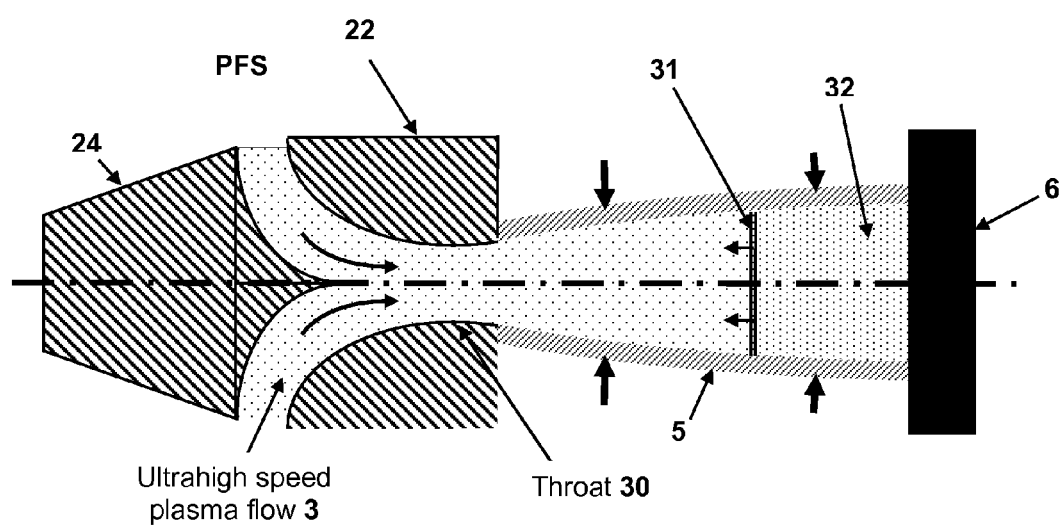
FIG. 3 shows a detailed schematic of the ultrahigh speed plasma flow entering the implosion volume through a nozzle throat.

The basic operation and arrangement of an embodiment of the invention are depicted in FIGS. 1-3. The plasma flow switch is a particular arrangement of a coaxial plasma gun that has the special attribute of providing magnetized-plasma flow at extraordinary speed (upwards of 2000 km/s). Stagnation of such flow can result in plasma temperatures of tens of keV for materials such as aluminum. For lower atomic number material, such as a deuterium-tritium mixture, the temperatures will be lower, but still in the range of a keV or more, much higher than available by other simple discharge techniques. Thus, the invention starts with a high enough temperature to approach conditions for significant rates of thermonuclear fusion. This high temperature implies that only moderate compression is needed to attain deuterium-tritium temperatures above 10 keV, even in the face of energy loss to radiation and heat conduction.

In general, the PFS, which requires currents of several megamperes, could be operated independently of a liner implosion system, which requires similar currents. Such operation would require a separate power source and switching system. The present invention permits the use of a single power source and a single switch for both the PFS and the liner implosion. This power source can be either a capacitor bank or a magnetic-flux compression generator, capable of providing multi-megampere currents with rise-times and pulse durations in the microsecond regime and energies above several megajoules.

FIG. 1 displays the basic concept of using a plasma flow switch to provide an ultrahigh speed plasma flow that stagnates within the implosion volume defined by the liner. The resulting high temperature plasma is then compressed to higher densities and temperatures by the liner implosion. The figure is a cross-section of a three-dimensional assembly with the axis of rotation shown as a dot-dash line.

In the FIG. 1a diagram the PFS consists of coaxial electrodes 1 (shown here as straight black lines); a plasma armature 2 created by electrical discharge through an initial foil in vacuum (not shown) and accelerated axially by electromagnetic (Lorentz) force; and a magnetized-plasma 3 trailing the plasma armature 2 and having a mass density much (100-1000×) less than that of the plasma armature. This low-density plasma can arise naturally in the PFS, but in an embodiment of the present invention is created by ionization of an injected gas-puff (see FIG. 2). The coaxial electrodes of FIG. 1a consist of a truncated cone shaped inner first electrode surrounded by a second electrode such as to form a first cavity within which are shown the plasma armature 2 and the low-density magnetized plasma 3. The larger diameter end of the truncated cone first electrode is the discharge end out through which passes the plasma armature and the low-density magnetized plasma during operation of the PFS. When the plasma armature passes over the end of the center conductor 4 as shown in FIG. 1b, it releases the low-density magnetized-plasma 3 as an ultrahigh speed plasma flow.

The ultrahigh speed plasma 3 flow is then injected into the volume defined by the imploding cylindrical liner 5 (FIG. 1c). The liner 5 closes an electrical circuit between the coaxial electrodes 6, 16 connected to a multi-megampere source (not shown) by transmission plates 7 and separated by insulation 8. A shaped center-post 9 is shown that would be used in larger versions of the invention to improve the mechanical stability of the assembly. It also improves the plasma stability against kinking. Note that the coaxial electrodes 1 of the PFS is angled outward from the centerline in order to reduce the possibility of mass from the plasma armature 2 from entering the implosion volume.

FIG. 1d is the final diagram of the sequence. It shows how the motion of the imploding liner 5 compresses the plasma 3, radially and axially, producing higher temperatures and densities.

FIG. 2 schematically displays an embodiment of the invention. The coaxial electrodes 6, 16 are shown in black, with solid insulation 8. The plasma armature 2 in the PFS is depicted at two times, just after discharge initiation 2a and as it releases 2b magnetized-plasma 3 to create the ultrahigh speed flow. The liner 5 is shown as a thick curved black line. The center-post 9, used in larger versions of the invention, is shown here. The current feed is baffled to attenuate ultraviolet and soft X-ray photons created by the electrical discharge.

The current flows from the power supply (a capacitor bank or a magnetic-flux compression generator not shown) along the upper transmission plate 7 and along the bottom surface of the upper electrode 6, through the liner 5 to the outer portion of the intermediate electrode 22, across the PFS gap 23 through the plasma armature 2 to the center conductor 24 and back to the power supply through the outer conductor 25 of the assembly and along the upper surface of the lower transmission plate 16.

A portion of the center conductor 24 is hollow to provide a pulsed reservoir 27 for injection of a gas-puff through a plurality of holes 28 just upstream of the initial position of the plasma armature 2. This reservoir is fed by a fast valve 29.

FIG. 3 provides a detailed schematic of the ultrahigh speed plasma flow 3 entering the implosion volume through a nozzle throat 30. The imploding liner 5 forms part of the nozzle at the upstream end of the implosion volume. A reflected shock front 31 (double-line in black) reflects from the closed end of the implosion volume (inner surface of the upper conductor 6), stagnating the supersonic flow and creating a hot magnetized-plasma target 32 for the liner implosion. The specific arrangement shown in FIG. 3 is for small devices that do not use the center-post 9 for mechanical and plasma stability, as shown schematically in FIGS. 1c, 1d and 2. In this example the nozzle 30 radius is 1 cm, the liner length from the nozzle to the inner surface of the upper conductor 6 is 10 cm, and the radius of the center conductor 24 of the PFS is 4.5 cm. The mean radius of the liner 5 is 2 cm.

Figure 4:
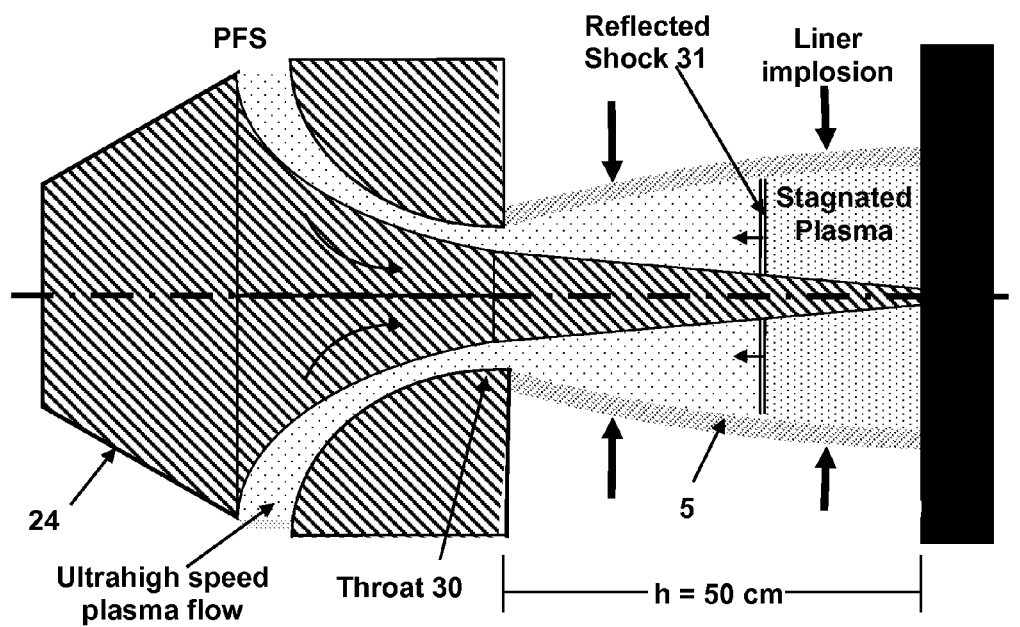
FIG. 4 is a detailed schematic of a larger version showing ultrahigh speed plasma flow entering the implosion volume through an annular nozzle that surrounds a center post and is used for improved stability.

FIG. 4 is a similar schematic to that of FIG. 3, but for a larger version in which an annular nozzle surrounds the center-post used for improved stability. In this example, the dimensions of the liner 5 length, liner radius, and nozzle radius, as well as the radius of the center conductor 24 have been increased by a factor of five. Here the mean radius of the liner 5 is 10 cm.

FIG. 5 provides examples of dimensionless solutions of a set of coupled, ordinary-differential equations governing the basic behavior of the combined plasma source and liner implosion system and used for design of the invention. The abscissa is time in units of $(L_oC)^{1/2}$, where $L_o$ is the initial circuit inductance and C is the bank capacitance.

Figure 5A:
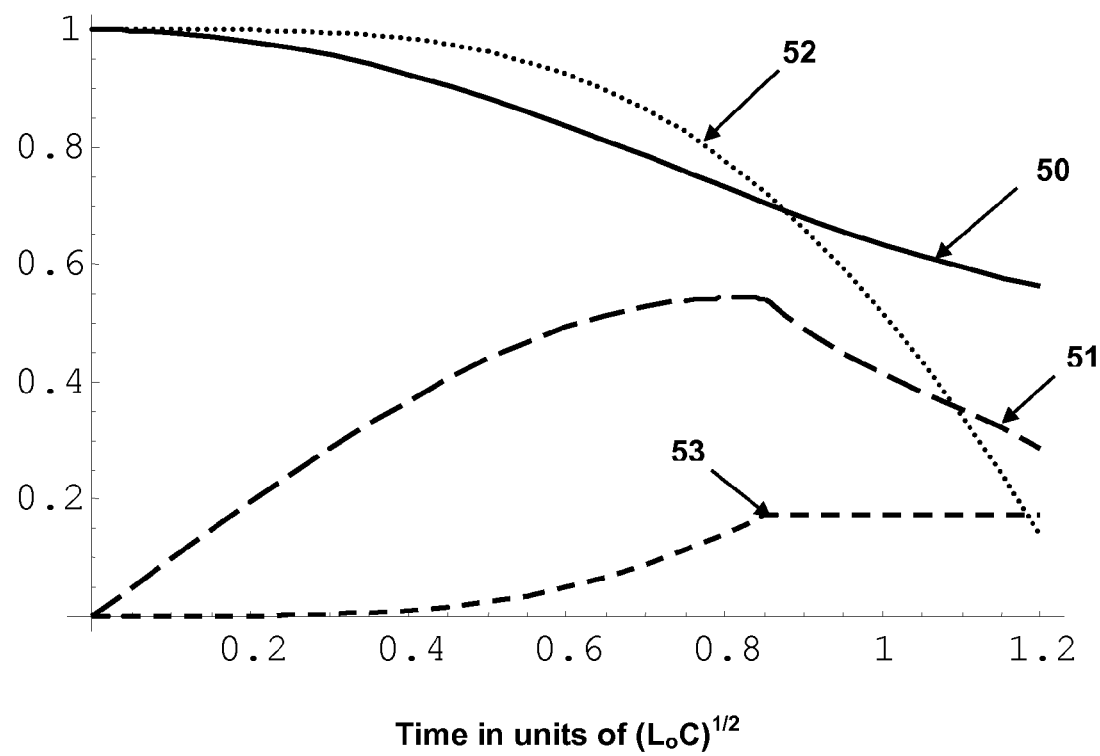
FIG. 5a is a plot of various calculated performance parameters using the values listed in Table I (FIG. 6).

In FIG. 5a the curve 50 is the bank voltage relative to its initial value, $V_o$; the circuit current 51 is shown relative to the ideal short-circuit current, $J_o=V_o/(L_o/C)^{1/2}$; the liner radius compared to its initial radius $r_o$ is curve 52, and the plasma armature displacement is curve 53 (in units of $L_o/[(\mu/2\pi)\ln(r_A/r_c)]$, where $r_A/r_c$ is the ratio of outer-to-inner conductor radii in the PFS).

Figure 5B:
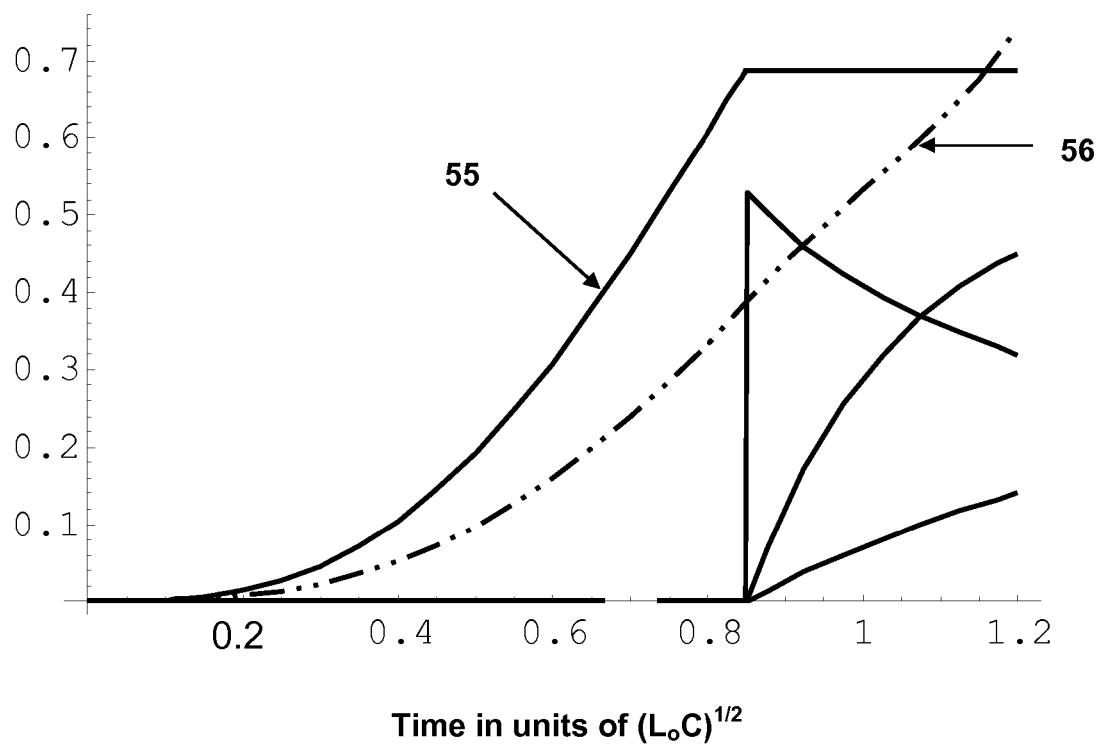
FIG. 5b is a plot of the calculated speed of the plasma armature and of the imploding liner based on Table I values.

In FIG. 5b the curve 55 is the speed of the plasma armature in units of $(L_o/C)^{1/2}/[(\mu/2\pi)\ln(r_A/r_c)]$ and the curve 56 is the speed of the imploding liner in units of $(L_o/C)^{1/2}/[(\mu/2/\pi)(h/r_o)]$, where h and $r_o$ are the initial length and radius of the liner, respectively. The other curves refer to conditions of the plasma injected into the implosion volume.

While the basic design, arrangement and operation of the invention remain as indicated schematically in the figures, the actual dimensions and the neutron output will scale with the energy and current available from the power source and needed by the mission application. Such scaling depends on two areas of design: 1) basic requirements on radii and lengths in terms of the necessary speeds and times; and 2) minimum radii and thicknesses associated with difficulties due to critical energy densities (e.g., onset of melting) and the potential consequences of instabilities. The former area of design makes use of standard calculation tools, first solving a set of coupled, ordinary-differential equations to determine the basic motion of the PFS armature and liner, and then employing numerical simulation, involving solution of coupled, partial-differential equations, to account for processes such as diffusion, phase-change and instabilities. The latter area of design introduces experience with maximum levels of operating magnetic field, current-joint approaches and instabilities in liners and plasma. Both of these design areas are well-known to practitioners of pulsed power engineering for multi-megampere, multi-megajoule systems at megagauss magnetic field levels in the microsecond regime.

FIG. 5 displays an example of the solution of the set of dimensionless ordinary-differential equations coupling a capacitor-type power source to the dynamics of the PFS and liner implosion. A critical aspect of the design provided by such solutions is the determination of the length of the PFS electrodes to release the magnetized-plasma at peak current and after the liner has attained adequate implosion speed. Table I (FIG. 6) provides a set of sample dimensions for the conditions of FIGS. 5a and 5b, using the Shiva Star capacitor bank at the Air Force Research Laboratory, Kirtland AFB, NM. In this example, the Shiva Star bank is charged initially to 90 kV, representing a system energy of 5.4 MJ. For the conditions of the Combined Plasma Source and Liner Implosion System in Table I, the deuterium-tritium plasma flow from the PFS passes through a nozzle throat of radius 1 cm and stagnates at 600 eV. The continued liner implosion traps this plasma and compresses it to 10 keV to provide a burst of about $5\times10^{17}$ (14.1 MeV) neutrons in about 600 ns.

Use of a source capable of higher currents and energies, such as an explosively-driven magnetic-flux compression generator, would allow larger dimensions for the liner and PFS and provide much higher values of neutron yield. For example, an initial liner radius of 150 mm at a peak magnetic field of one megagauss corresponds to a peak current of 75 MA. By increasing the liner length a similar factor of five, substituting copper for lithium as the liner material (8.9 vs. 0.54 g/cm$^3$), and adjusting the circuit to achieve the same liner implosion speed as in the example with Shiva Star, the energy of the compressed deuterium-tritium plasma increases by a factor of over 400, while the dwell time near fusion conditions increases by a factor five, thereby increasing the gain relative to the plasma energy by five. The resulting neutron burst from this plasma then exceeds the Shiva Star example by a factor of about 2000 (to over $10^{21}$ D-T neutrons). Note that this estimate does not include enhancements due to alpha-particle deposition in the magnetized-plasma near peak compression.

The invention claimed is:

1. A combined plasma flow switch plasma source and liner implosion system employing a single power source and a single switch for producing a compact, intense pulsed neutron source based on thermonuclear reactions in compressed plasma, said system comprised of:
   a. a plasma flow switch plasma source comprised of:
      (1) a coaxial pair of electrodes, said coaxial pair of electrodes consisting of a first electrode and a second electrode, said first electrode being a truncated cone and surrounded by said second electrode forming an initially evacuated first cavity, said first electrode having an upper discharge end corresponding to a larger diameter end of its truncated cone and a lower end corresponding to a smaller diameter end, said second electrode having upper and lower ends corresponding to those of said first electrode's upper and lower ends;
      (2) a thin foil of conductive material connecting said first electrode to said second electrode and dividing said first cavity into a downstream portion of said first cavity corresponding to said upper discharge end of said first electrode and an upstream portion of said first cavity corresponding to said lower end of said first electrode, and said thin foil being located approximately half way between the upstream and downstream portions of said first cavity;
   c. an ultraviolet baffle between said lower end of said second electrode and said first electrode;
   d. a reservoir within said first electrode truncated cone with a plurality of holes connecting said reservoir to said upstream portion of said first cavity;
   e. a source of deuterium-tritium gas mixture;
   f. a fast valve for the injection of said deuterium-tritium gas mixture into said reservoir;
   g. a liner implosion system comprised of a cylindrical-like lithium or lithium-coated liner connecting the downstream end of said second electrode to a multi-megampere current source, said liner forming a second evacuated cavity connected to said first cavity at the downstream end of said first cavity, and said liner further having the shape of a nozzle throat at the intersection of said first and second cavities;
   h. a switch for said multi-megampere current source; and
   i. means for timing the injection of said deuterium-tritium gas mixture into said upstream portion of said first cavity and the initiation of said mufti-megampere current source whereby said plasma flow switch plasma source injects said deuterium-tritium gas mixture into said second cavity at approximately 2000 km/s as said liner collapses to compress said mixture to high temperatures and densities sufficient to initiate thermonuclear reactions.

2. The device of claim 1, wherein a cone-shaped center post is provided within said second cavity extending between the top of said first electrode inner core and a closed end of said second cavity.

3. The device of claim 1, wherein said means for timing the injection of said deuterium-tritium gas mixture into said second cavity is by adjusting the length of said plasma flow switch first and second electrodes.

* * * * *